United States Patent [19]
Muto

[11] Patent Number: 5,420,777
[45] Date of Patent: May 30, 1995

[54] SWITCHING TYPE DC-DC CONVERTER HAVING INCREASING CONVERSION EFFICIENCY AT LIGHT LOAD

[75] Inventor: Takanori Muto, Tokyo, Japan

[73] Assignee: NEC Corporation, Japan

[21] Appl. No.: 248,495

[22] Filed: May 24, 1994

[30] Foreign Application Priority Data

Jun. 7, 1993 [JP] Japan ................... 5-135488

[51] Int. Cl.[6] ........................................... H02M 3/335
[52] U.S. Cl. ................................................. 363/21
[58] Field of Search .................. 363/15, 16, 20, 21, 363/56, 74, 77, 78, 95, 97, 131, 164, 165; 323/222, 282, 290

[56] References Cited

U.S. PATENT DOCUMENTS

| | | | |
|---|---|---|---|
| 4,695,936 | 9/1987 | Whittle | 363/21 |
| 4,835,669 | 5/1989 | Hancock et al. | 363/21 |
| 5,055,991 | 10/1991 | Carroll et al. | 363/21 |
| 5,313,381 | 5/1994 | Balakrishnan | 363/21 |
| 5,331,532 | 7/1994 | Iwai et al. | 363/20 |

FOREIGN PATENT DOCUMENTS

| | | | |
|---|---|---|---|
| 73555 | 3/1989 | Japan | G11B 19/10 |
| 309585 | 12/1989 | Japan | . |

Primary Examiner—Thomas M. Dougherty
Assistant Examiner—Matthew V. Nguyen
Attorney, Agent, or Firm—Whitham, Curtis, Whitham & McGinn

[57] ABSTRACT

In a switching type DC-DC converter, switching frequency f, gate to source voltage of a switching FET, and the stray capacity of the FET are decreased at light load period to increase conversion efficiency at light load. In another embodiment, no-load current is decreased by increasing self inductance of a smoothing choke at light load.

18 Claims, 9 Drawing Sheets

(a): LIGHT LOAD CURRENT
(b): THRESHOLD LOAD CURRENT
(c): NORMAL LOAD CURRENT

SWITCHING TYPE DC-DC CONVERTER HAVING INCREASING CONVERSION EFFICIENCY AT LIGHT LOAD

BACKGROUND OF THE INVENTION

This invention relates to a switching type PC-PC converter, and more particularly to means for increasing conversion efficiency at light load.

In a switching type PC-PC converter, a primary DC power supply is switched by a switching element for generating an alternating current which flows in a primary winding of a transformer. An alternating current voltage induced in a secondary winding of the transformer is rectified to produce a secondary DC voltage which has a voltage value different from that of the primary DC power supply.

Usually, load current of such PC-PC converter varies in a wide range, and the apparatus is often used at a light load for a long time. Therefore, high conversion efficiency at light load is desired for such a DC-DC converter.

There have been several proposals of an apparatus for increasing light load efficiency of such PC-PC converters. For example, in a Japanese Patent Application No. 309585/'89 (laid open as No. 173352/'91, called Ref. 1 in this specification), the switching of the primary DC power supply is operated intermittently during light load period. During a quiescent phase of the switching, DC current is supplied to a load by a capacitor connected in parallel to the load. Therefore, the capacitor must have a fairly large capacity and this makes an obstacle against miniaturization of the apparatus. And in Ref. 1, light load is detected by a rise of an output voltage. This is not to be recommended when a good voltage regulation is required for the apparatus. Moreover, when the load current is abruptly increased in the apparatus of Ref. 1, the output voltage will suddenly drop due to a sudden discharge of the capacitor and will require a fairly long time to recharge the capacitor even when the switching circuit is instantly changed to a full time operation from the intermittent operation.

In another Japanese Patent Application No. 73555/'89 (laid open as No. 254972/'90, called Ref. 2 in this specification), a snubber capacitor is decreased in capacity during a light load period. In an ordinary type DC-DC converter., a capacitor called a snubber capacitor is connected in parallel to the switching element for protecting the switching element from a surge voltage generated by a primary current in the primary winding of the transformer and the leakage inductance of the winding. When the load current is decreased in a light load period, the primary current is also decreased, and a smaller capacity of the snubber capacitor will be sufficient for protecting the switching element. A voltage on the snubber capacitor charged during an off-phase of the switching, is discharged during an on-phase of the switching, making a power loss independent of the load current. This power loss is decreased when the capacity of the snubber capacitor is decreased. In Ref. 2, the light load is detected by a decrease of surge peak voltage across the snubber capacitor, and this decrease of the peak voltage automatically disconnects a part of the snubber capacitor.

In an apparatus of Ref. 2, only a part of the power loss independent of the load current is decreased, and even when all the snubber capacitor is removed, there remains a stray capacity in parallel to the switching element. Charging and discharging of this stray capacity makes a substantial loss in a light load period.

SUMMARY OF THE INVENTION

Therefore, an object of the present invention is to provide an apparatus wherein power conversion efficiency is excellent at a light load as well as at a normal load. In order to achieve the object, the switching frequency f is decreased and the gate drive voltage VGS is decreased in a light load period.

A maximum power Pmax delivered to a load from a flyback type DC-DC converter is represented by equation:

$$P_{max} = (\tfrac{1}{2})L(IDP)\,f \ldots \tag{1}$$

Where L is an inductance of a primary winding in a transformer where the current of the switching element flows, IDP is a peak value of the switched current when the switch is closed, and f is the frequency of switching. During a light load period, Pmax can be small, and f can be made small.

On the other hand, power loss of switching occurs at each switching cycle, and when the switching frequency f is reduced, the power loss of switching decreases in proportion to the value of f. In an embodiment of this invention, the value of f is decreased in a light load period.

When VGS is decreased, an on-state internal resistance RON of the switching element increases; and this increase increases power loss dependent of the load power. But this increase of the power loss is small at a light load. On the other hand, a switching power loss decreases in proportion to a square of VGS. In an embodiment of this invention, the value of VGS is decreased in a light load period.

In another embodiment of this invention, stray capacity of a switching element is decreased in a light load period. The switching element of the embodiment comprises two FETs(Field Effect Transistor) which, in parallel can switch IDP for Pmax at a normal load. One of the FETs is cut off from the switching circuit in a light load period, for reducing stray capacity of the switching element.

In a preferred embodiment of this invention, a switching type DC-DC converter comprises a primary DC power supply, switching means connected in series with the power supply through a primary winding of a transformer, a rectifier circuit connected to a secondary winding of the transformer, a PWM(pulse width modulation) controller for supplying a switching signal to the switching means, the switching signal being a rectangular pulse train having a repetition frequency f, an amplitude VGS and a controllable pulse width, and means for controlling the PWM controller wherein the controllable pulse width is controlled to keep an output voltage of the rectifier circuit at a constant value;

characterized in that:

the switching means comprises an FET, and the means for controlling the PWM controller further comprises;

a load current detector for generating a voltage indicating a load current of the rectifier circuit, a comparator for comparing output voltage of the load current detector to a predetermined reference voltage, means for decreasing frequency f of the switching signal when output of the comparator shows that output voltage of the load current detector is lower than the reference voltage, and means for decreasing voltage VGS of the switching signal when output of the comparator shows that the output voltage of the load current detector is lower than the reference voltage.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
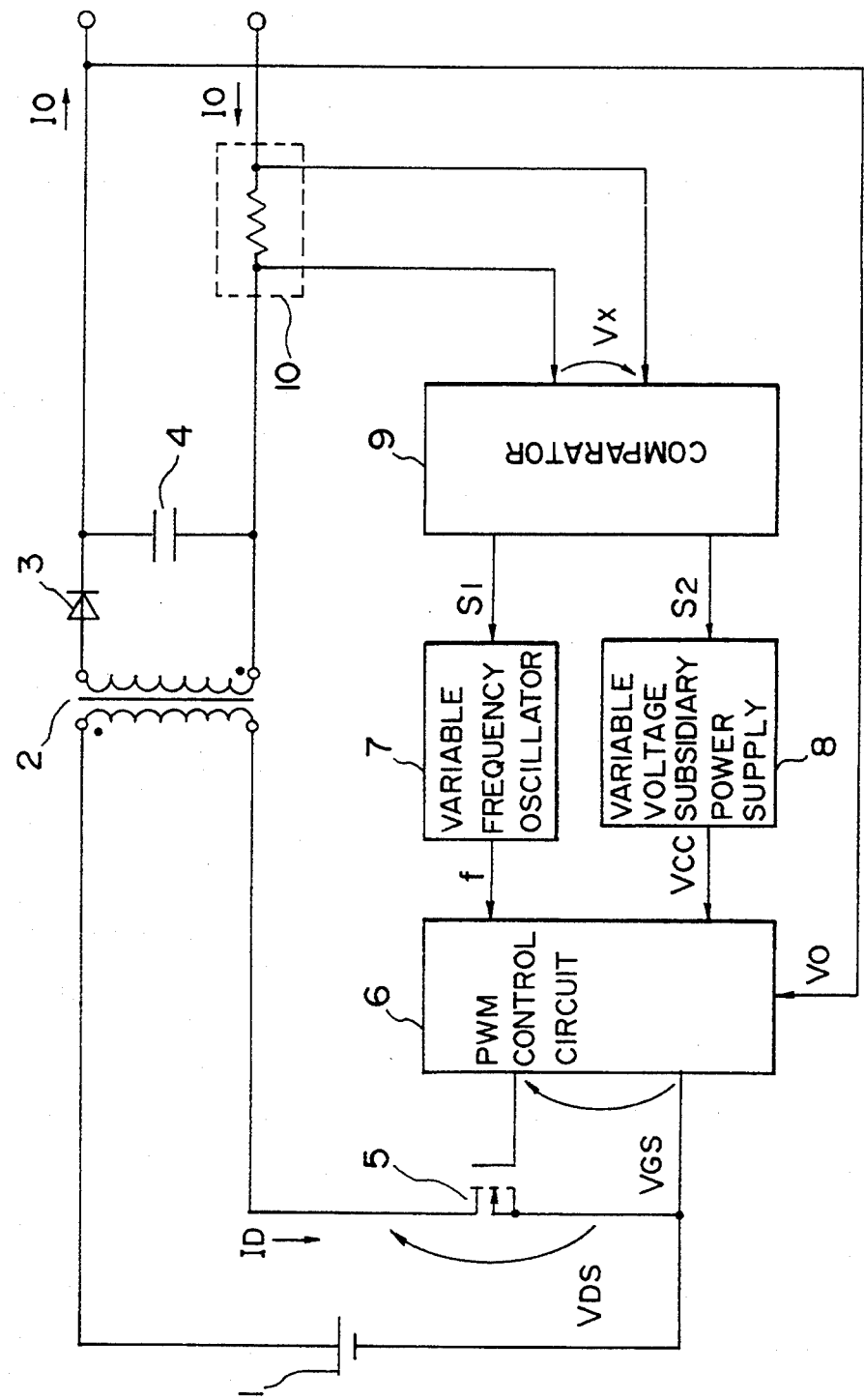
FIG. 1 shows a schematic diagram of an embodiment of this invention.
Figure 9:
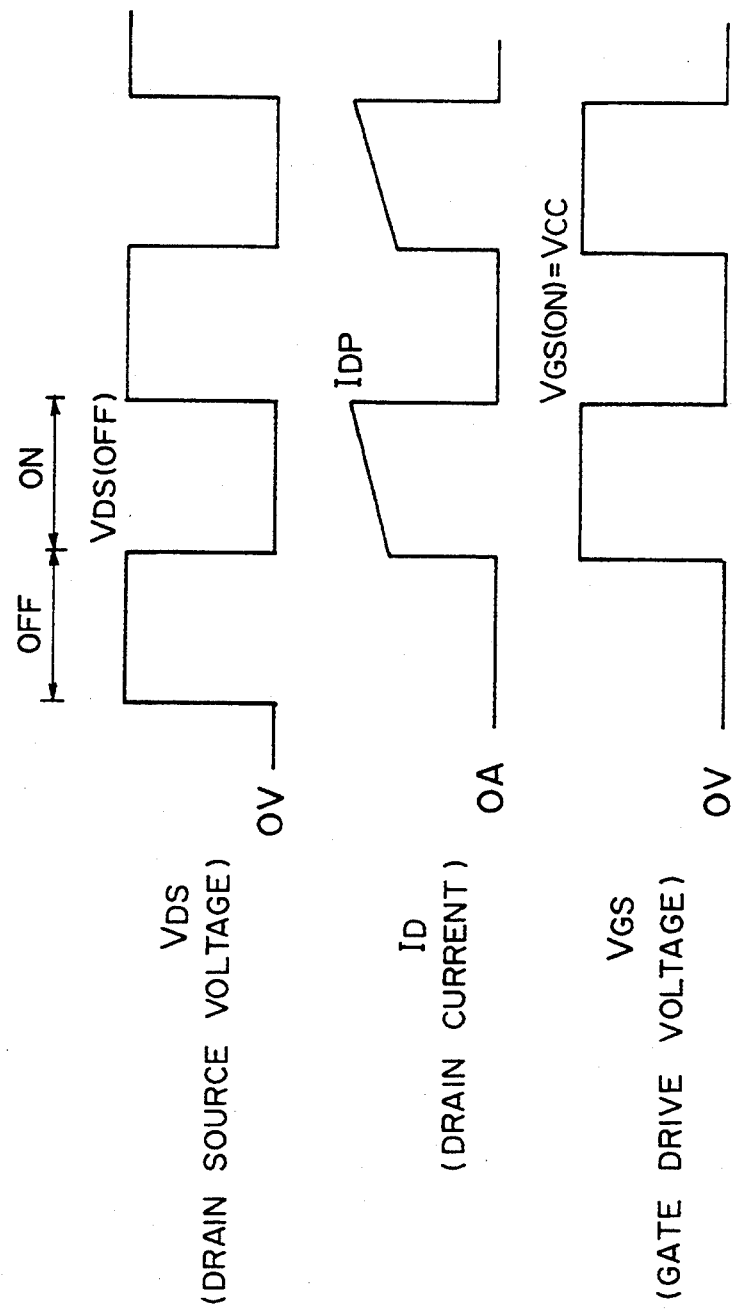
FIG. 9 shows waveforms of the switching element in FIGS. 1, 2, 3, 4.

Referring to FIG. 1, a closed circuit from a primary DC power supply 1, to a primary winding of a transformer 2, a switching element 5, and back to the power supply 1 is switched by the switching element 5. FIG. 9 shows an example of switching waveforms when the switching element is an FET. A gate drive voltage VGS which is a voltage between the gate and the source of the FET 5 is applied as a rectangular voltage denoted by VGS in FIG. 9. The FET 5 is turned on, and the drain source voltage VDS of the FET 5 becomes practically zero. The drain current ID flows through the primary winding of the transformer 2 as shown by ID in FIG. 9. The drain current induces a voltage in the secondary winding of the transformer 2. The voltage induced in the secondary of the transformer 2 is rectified by a rectifier diode 3 and charges a smoothing capacitor 4. Load current IO is obtained by discharging the capacitor 4.

The pulse width of the gate drive voltage VGS is controlled by a PWM control circuit 6. An output voltage VO is compared to a reference voltage in the PWM control circuit 6. The error voltage which is a difference between the output voltage and the reference voltage feedback-controls the pulse width in the PWM controller 6 to keep the error voltage practically zero.

In this embodiment, a load current detector 10 is a resistor for generating a voltage $V_x$ which is proportional to IO. $V_x$ is compared to a predetermined reference voltage Vre in a comparator 9. When $V_x <$ Vref, the comparator 9 delivers logic "H" signal as S1 and S2, and otherwise, the comparator 9 delivers logic "L" signal. For a logic "L" signal of S1 and S2, control frequency f from a variable frequency oscillator 7 and control voltage from a variable voltage subsidiary power supply 8 are maintained at normal values.

For a logic "H" signal of S1 and S2, the control frequency f is decreased and the control voltage VCC is decreased for decreasing switching loss in the apparatus.

Figure 7:
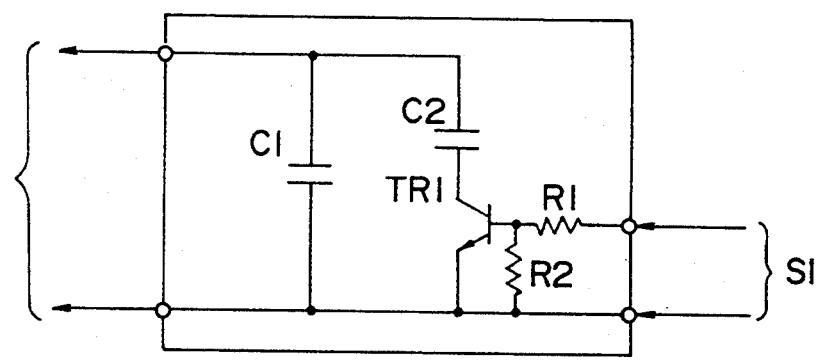
FIG. 7 shows a part of the circuit diagram of the variable frequency oscillator in FIG. 1 and FIG. 2.

FIG. 7 shows an example of frequency control in the variable frequency oscillator 7. When the signal S1 is at logic "H", a capacitor C2 is connected in parallel to a capacitor C1 and the generated frequency f is lowered.

Figure 10:
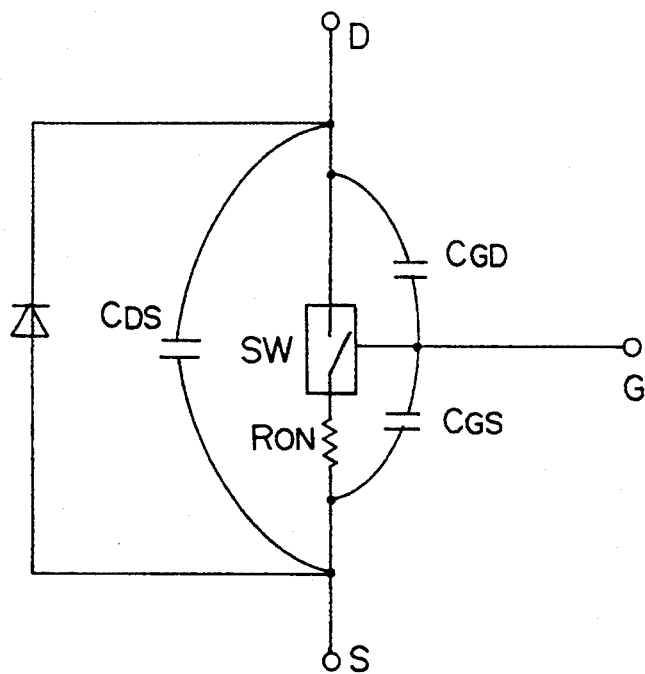
FIG. 10 shows an equivalent circuit of the switching element in FIG. 1 and FIG. 2.

FIG. 10 shows stray capacities of an FET 5 where S is the source, D is the drain, and G is the gate. There are stray capacitors CDS from the drain to the source, CGS from the gate to the source, and CGD from the drain to the gate. During an off-period of the drain current, CDS and CGD are charged to VDS. This charging requires an energy WL represented by equation (2). WL = Coss (VDS(OFF))$^2$/2...(2), where Coss = CDS + CGD. This energy is dissipated in the FET during the following on-period of the drain current. Hence the energy WL is dissipated at each switching cycle. When f(which means switching cycles per second) is decreased, power loss (which means energy dissipation per unit time) is decreased in proportion to f.

The stray capacity, which exists from gate to source and is charged to VGS during an on-period of the drain current as shown in FIG. 9, is seemingly equal to sum of CGS and CGD. But the actual capacity charged to VGS during an on-period is bigger than sum of CGS and CGD, because there exists Miller effect in CGD. So an energy WG required for this charging is represented by equation (3). WG = (QG)(VGS(ON))...(3), where QG is electrical charge which is charged from gate to source during an on-period. Half of this energy is dissipated for charging during on-period, and another half of this energy is dissipated for discharging during the following off-period in the PWM controller 6.

Therefore, when VGS is decreased, the loss caused QG decreases in propotion to f and the square of VGS, because QG decreases in proportion to VGS.

Figure 11:
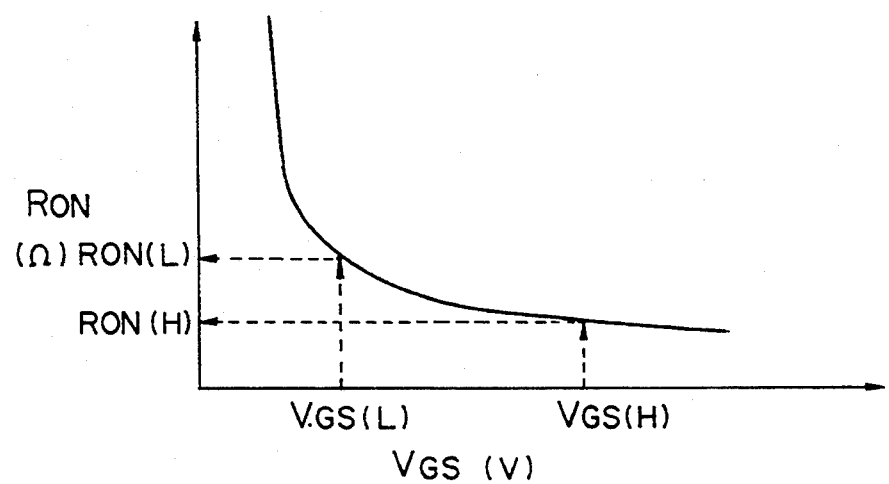
FIG. 11 shows a relation between gate source voltage and on-state resistance of the switching element.

When VGS is decreased, an on-state resistance RON of the FET 5 increase as shown in FIG. 11. This increase of RON increases resistance loss in the FET 5. In a light load state, this increase of loss is smaller than the decrease of loss expected from equation (3).

Figure 5:
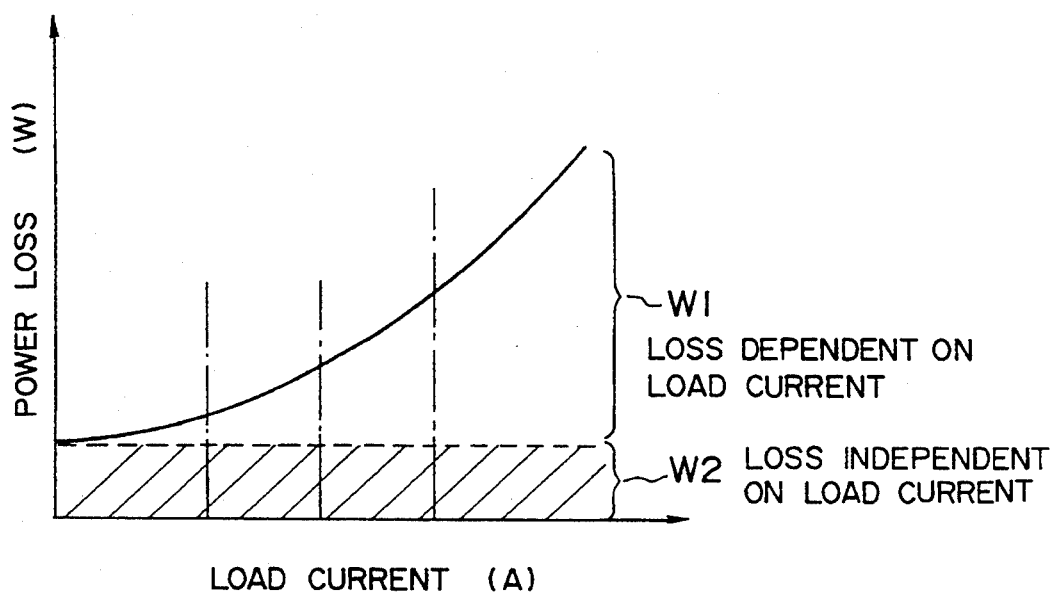
FIG. 5 shows load current to power loss relation in a heretofore known apparatus.

FIG. 5 shows load current to power loss relation in a heretofore known apparatus. There are loss W1 which is dependent on load current(proportional to a square of the load current), and loss W2 which is independent on load current. In a light load range, the loss W2 is relatively large to the load current, deteriorating power conversion efficiency in this range.

Figure 6:
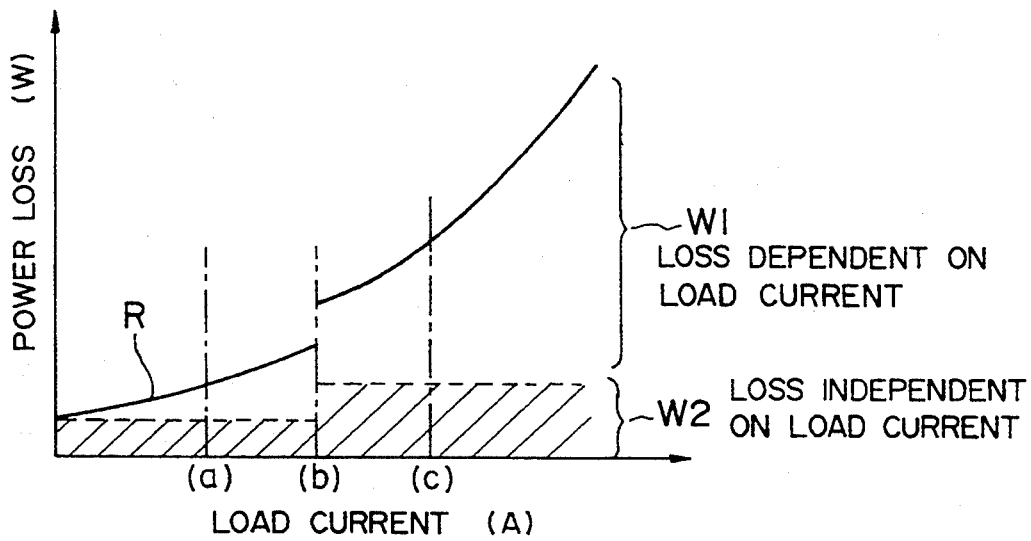
FIG. 6 shows load current to power loss relation in an apparatus of this invention.
Figure 8:
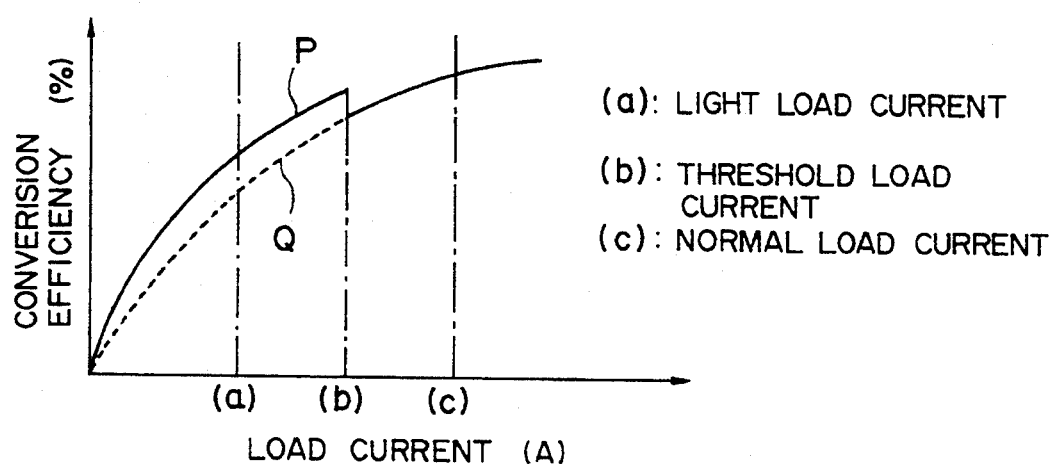
FIG. 8 shows conversion efficiency improvement in an embodiment of this invention.

FIG. 6 shows load current to power loss relation of an apparatus of this invention. The loss W1 which is dependent on load current is the same in FIG. 5 and FIG. 6. The loss W2 which is independent on load current in a normal load range as indicated by (c) in FIG. 6 is the same in FIG. 5. At point (b) of the load current in FIG. 6, the output logic of the comparator 9 changes, and in a light load range indicated by (a) in FIG. 6, the loss W2 is decreased due to the decrease of frequency f and the decrease of VGS(ON) in equation (3). Thus, the conversion efficiency of the apparatus is increased in the light load range. The conversion efficiency of the apparatus of this invention is shown by a solid line P in FIG. 8. The dotted line Q in FIG. 8 shows the conversion efficiency of a heretofore known apparatus.

Figure 2:
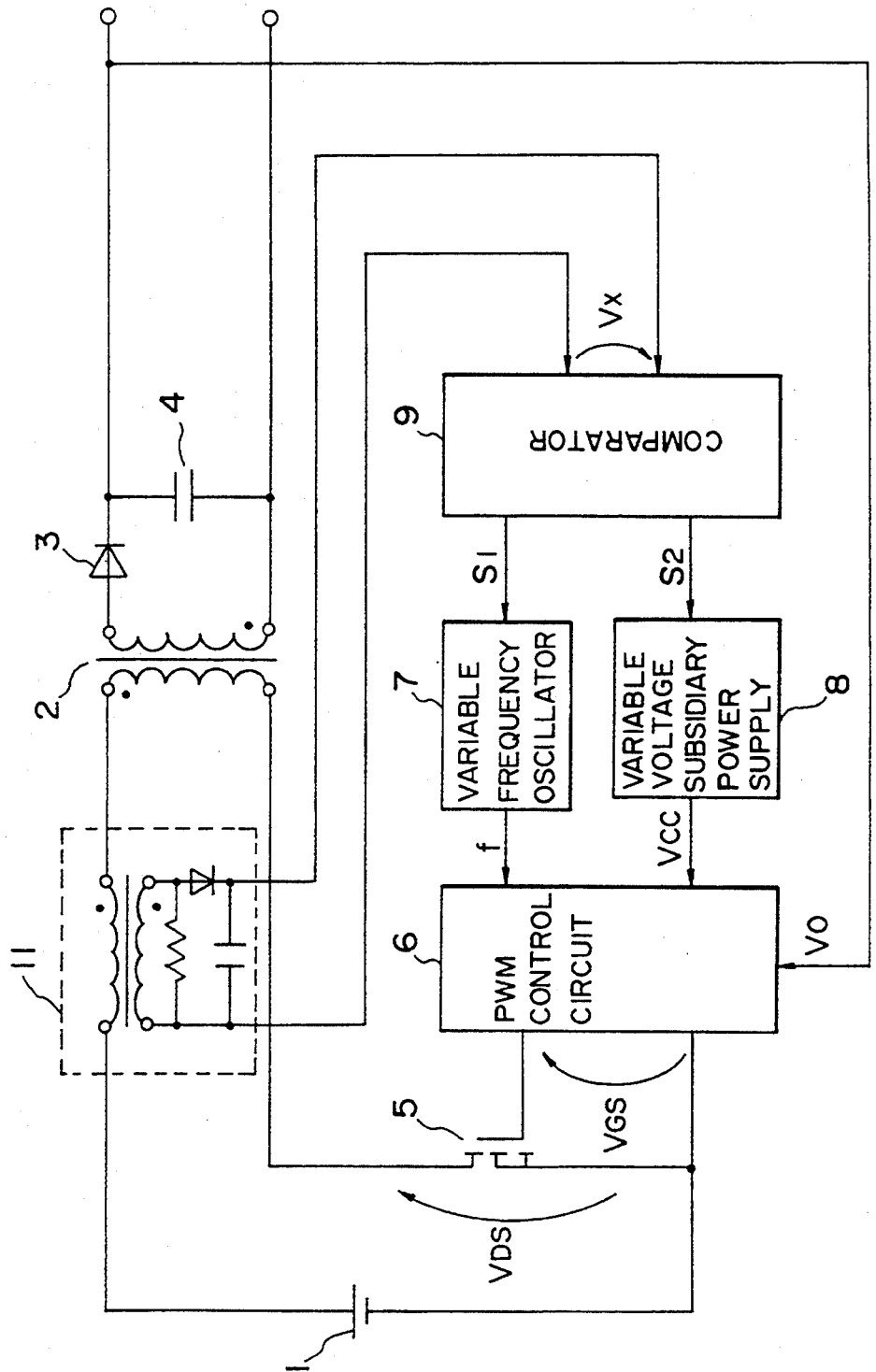
FIG. 2 shows a schematic diagram of another embodiment of this invention.

FIG. 2 shows a modification of the embodiment shown by FIG. 1. A load current detector comprises a current transformer 11 inserted in series to the primary winding of the transformer 2. The secondary voltage of the current transformer 11 is rectified and smoothed to give a voltage $V_x$ which is a function of the load current IO.

Figure 3:
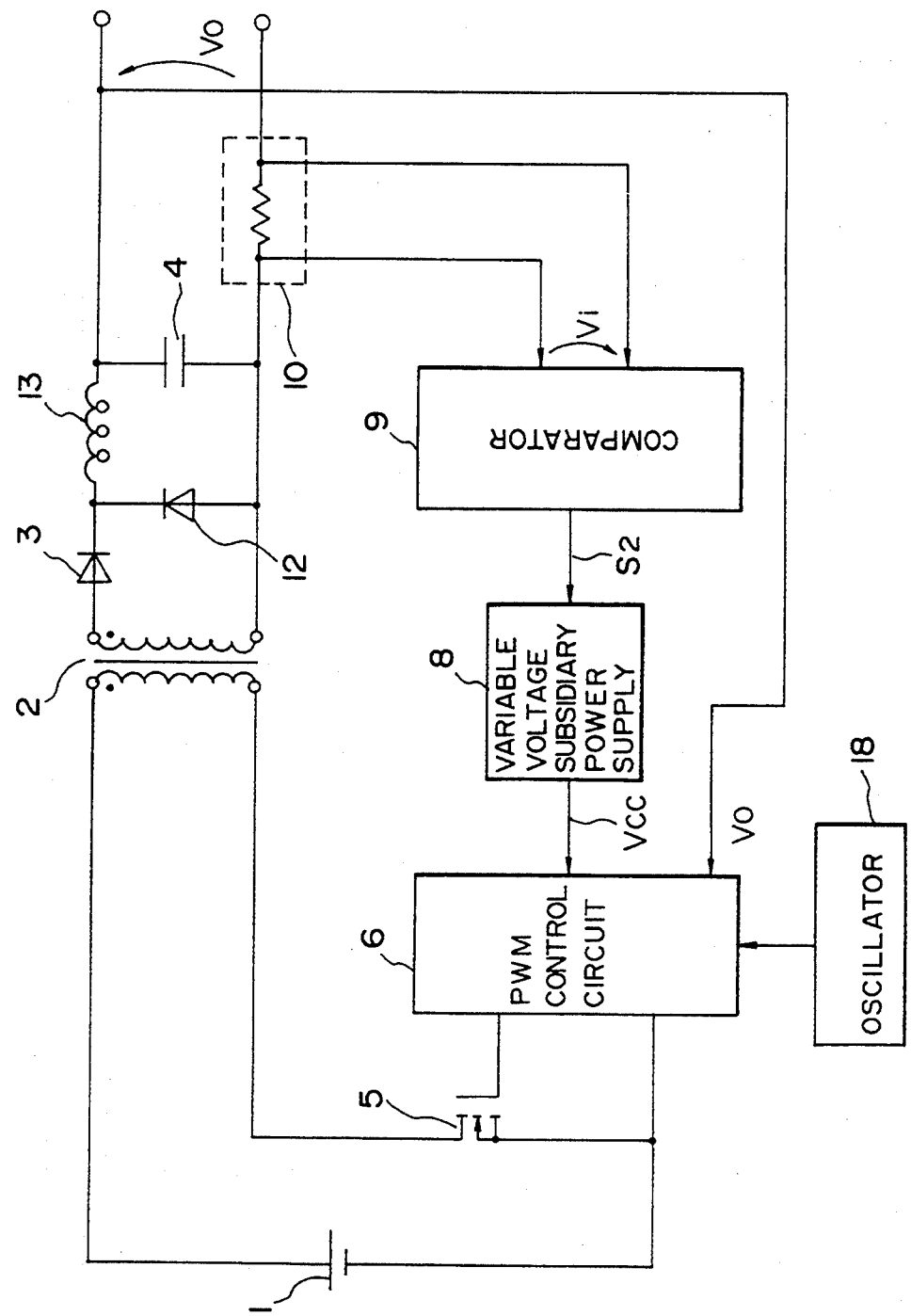
FIG. 3 shows a schematic diagram of still another embodiment of this invention.

FIG. 3 shows another modification of the embodiment shown by FIG. 1. FIG. 1 shows a flyback type switching converter wherein the switching frequency is changed without restraint, while FIG. 3 shows a forward type switching converter wherein a changeable range of the switching frequency is restrained by the saturation of magnetic flux density of the transformer 2 and the resonance frequency of the secondary circuit of the transformer 2 which has a flywheel diode 12, a smoothing coil 13, and a smoothing capacitor 4, connected via the rectifier diode 3. Therefore, only VGS(ON) in equation (3) is changed by the variable voltage subsidiary power supply 8.

A fixed frequency oscillator 18 supplies a fixed frequency voltage to the PWM.

It must be noted that the switching frequency f or the switching voltage VGS(ON) can be independently changed for obtaining respective effect.

Figure 4:
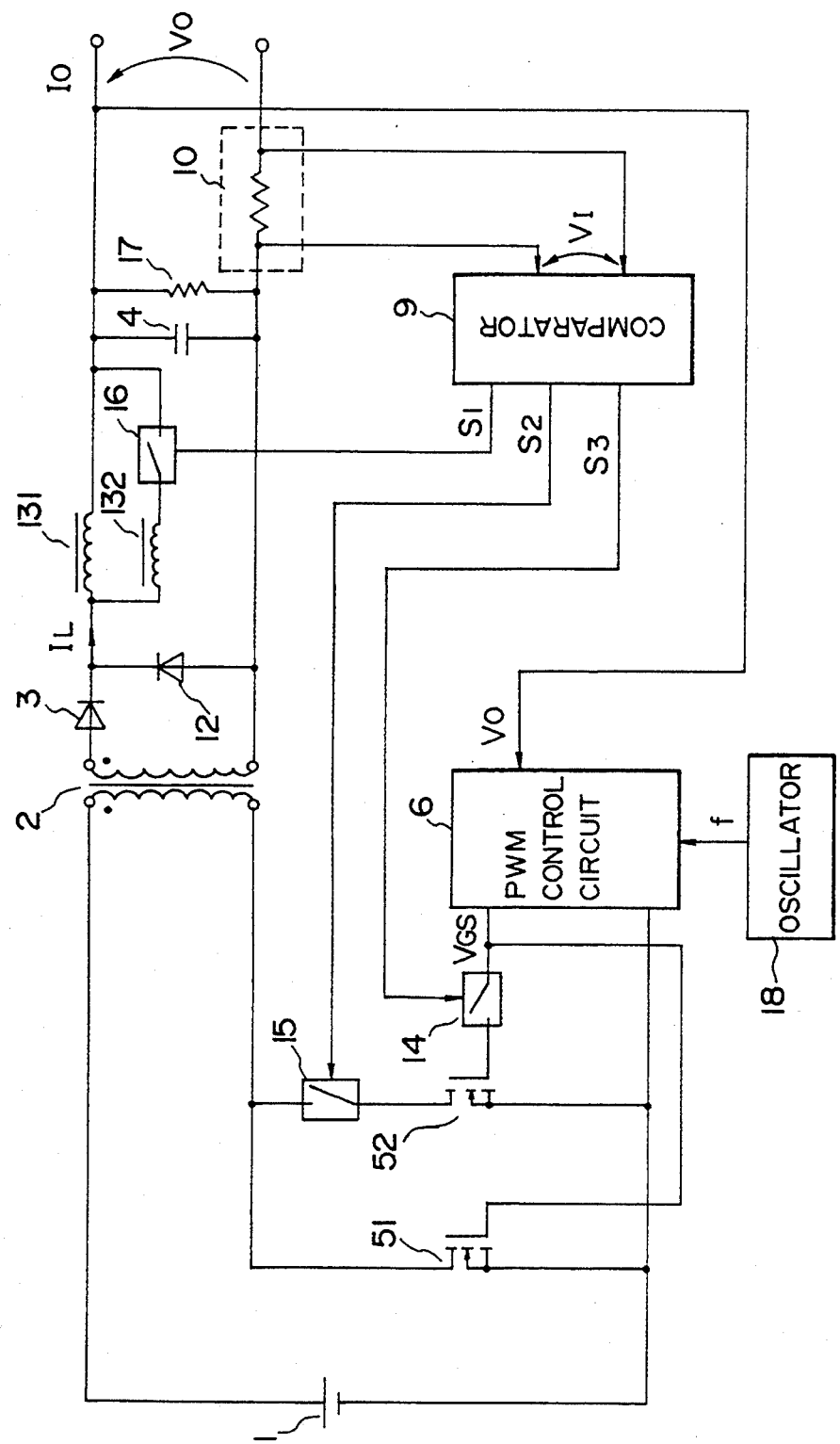
FIG. 4 shows a schematic diagram of still another embodiment of this invention.

FIG. 4 shows another embodiment of this invention wherein two switching elements 51 and 52 are connected in parallel for switching in a normal load range. In a light load range, one switching element 52 is cut off by on-off switches 14 and 15 actuated by output of the comparator 9. This reduces capacity Coss in equation (2) and charge QG in equation (3), and therefore reduces the power loss in the light load range.

The switching converter shown by FIG. 4 is also a forward type like the switching converter shown by FIG. 3. A fixed frequency oscillator 18 supplies a fixed frequency voltage to the PWM control circuit 6. The gate drive voltage VGS may be controlled by the output of the comparator, but in an embodiment shown by FIG. 4, the gate drive voltage is not controlled.

A smoothing choke 13 of FIG. 4 comprises two smoothing chokes 131 and 132, and the smoothing choke 132 is cut off in a light load range by the output of the comparator 9 via an on-off switch 16 for reducing power loss in the light load range.

For a stable operation, current in a smoothing choke must not be in discontinuous mode which causes unstable operation of a DC-DC converter. A bleeder or a dummy load 17 is provided for keeping the choke current in a continuous mode for stable operation. The on-off switch 16 is provided for reducing the current in the dummy load.

Figure 12:
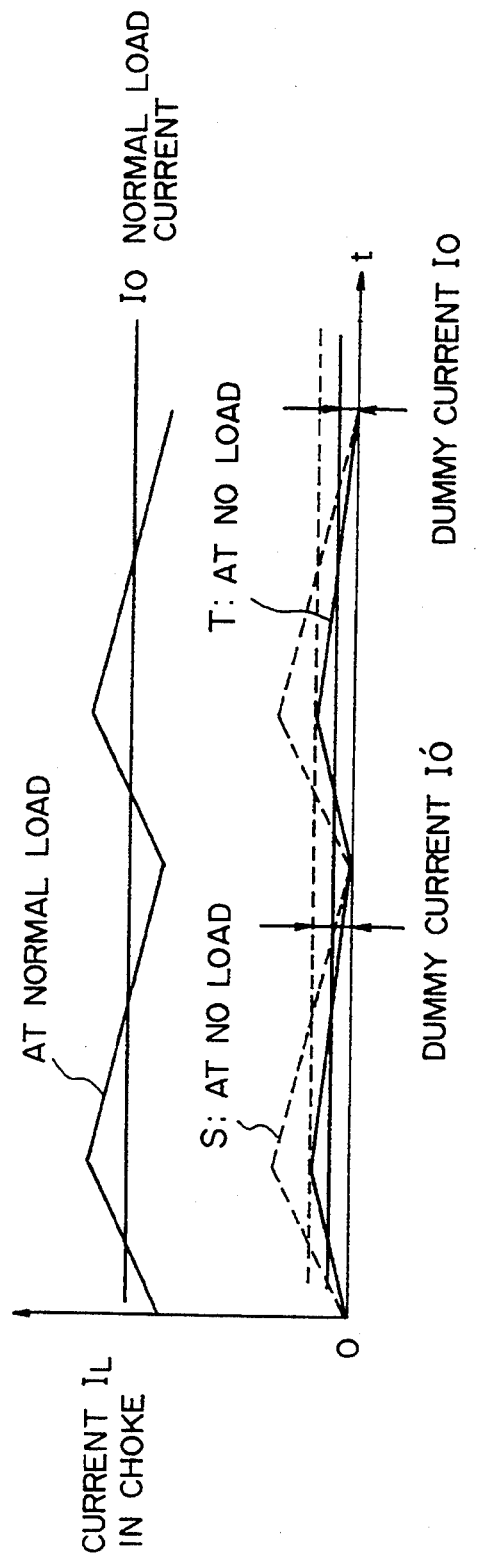
FIG. 12 shows waveforms of currents in the smoothing choke in FIG. 4.

FIG. 12 shows waveforms of currents in the smoothing choke and shows value of currents in the dummy load 17. There is an equation $E=L(dI/dt)...(4)$, where E is a voltage across the choke, I is a current in the choke, d/dr is a time derivative, and L is the self inductance of the choke. When E has a rectangular waveform, I has a linearly rising and linearly falling waveform as shown by current IL in choke. The inclination of I is inversely proportional to L. At a normal load IO, the average value of the load current IL in choke is equal to the load current IO. When IO=0, the current in choke is reduced, keeping the rising and the falling rate constant. And, since the current in coil must not be negative, a smallest value of the current is zero as shown by S in FIG. 12.

In a heretofore known apparatus, when the current in choke is as shown by S in FIG. 12, the average current ID' of the current S must be drained in the dummy load 17. In the apparatus of this invention, when the choke 132 is cut off by the switch 16 at a light load, the self inductance L of the choke is increased. The inclination of current in choke is reduced as shown by T in FIG. 12. Consequently, a reduced current value can be used for the dummy current ID and power loss in a light load range is reduced.

It must be noted that the switching element 52 and the smoothing choke 132 can be independently cut off for obtaining respective effect.

What is claimed is:

1. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:

said switching means comprises an FET, and said means for controlling said PWM controller further comprises:

a load current detector for generating a voltage indicating a load current of said rectifier circuit, a comparator for comparing output voltage of said load current detector to a predetermined reference voltage, and means for decreasing the frequency (f) of said switching signal when output of said comparator shows that the output voltage of the load current detector is lower than said reference voltage.

2. A switching type DC-DC converter of claim 1, wherein said load current detector comprises a resistor inserted in a path of a load current of said rectifier circuit.

3. A switching type DC-DC converter of claim 1, wherein said load current detector comprises a current transformer connected in series of said switching means through said primary winding of said transformer, and a rectifier for detecting an amplitude of a voltage induced in a secondary winding of said current transformer.

4. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:

said switching means comprises an FET, and said means for controlling said PWM controller further comprises:

a load current detector for generating a voltage indicating a load current of said rectifier circuit, a comparator for comparing output voltage of said load current detector to a predetermined reference voltage, and means for decreasing amplitude (VGS) of said switching signal when output of said comparator shows that the output voltage of said load current detector is lower than said reference voltage.

5. A switching type PC-PC converter of claim 4, wherein said load current detector comprises a resistor inserted in a path of a load current of said rectifier circuit.

6. A switching type DC-DC converter of claim 4, wherein said load current detector comprises a current transformer connected in series of said switching means through said primary winding of said transformer, and a rectifier for detecting an amplitude of a voltage induced in a secondary winding of said current transformer.

7. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:

said switching means comprises an FET, and said means for controlling said PWM controller further comprises:

a load current detector for generating a voltage indicating a load current of said rectifier circuit, a comparator for comparing output voltage of said load current detector to a predetermined reference voltage, means for decreasing frequency (f) of said switching signal when output of said comparator shows that output voltage of said load current detector is lower than said reference voltage, and means for decreasing amplitude (VGS) of said switching signal when output of said comparator shows that said output voltage of said load current detector is lower than said reference voltage.

8. A switching type DC-DC converter of claim 7, wherein said load current detector comprises a resistor inserted in a path of a load current of said rectifier circuit.

9. A switching type DC-DC converter of claim 7, wherein said load current detector comprises a current transformer connected in series of said switching means through said primary winding of said transformer, and a rectifier for detecting an amplitude of a voltage induced in a secondary winding of said current transformer.

10. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:

said switching means comprises a first FET, and a second FET connected in parallel to said first FET or disconnected from said switching means by on-off switch means, said switching type DC-DC converter further comprises;

a load current detector for generating voltage indicating a load current of said rectifier circuit, a comparator for comparing output voltage of said load current detector to a predetermined reference voltage, and means for disconnecting said second FET when output of said comparator shows that the output voltage of the load current detector is lower than said reference voltage.

11. A switching type DC-DC converter of claim 10, wherein said load current detector comprises a resistor inserted in a path of a load current of said rectifier circuit.

12. A switching type DC-DC converter of claim 10, wherein said load current detector comprises a current transformer connected in series of said switching means through said primary winding of said transformer, and a rectifier for detecting an amplitude of a voltage induced in a secondary winding of said current transformer.

13. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:

said rectifier circuit is connected to a smoothing circuit comprising a smoothing capacitor, a first smoothing choke for connecting output of said rectifier circuit to said smoothing capacitor, a second smoothing choke connected in parallel to said first smoothing choke or disconnected from said smoothing circuit by an on-off switch means, and a dummy load connected in parallel to said smoothing capacitor, said switching type DC-DC converter further comprises:

a load current detector for generating a voltage indicating a load current of said rectifier circuit, a comparator for comparing output voltage of said load current detector to a predetermined reference voltage, and means for disconnecting said second smoothing choke when output of said comparator shows that the output voltage of the load current detector is lower than said reference voltage.

14. A switching type DC-DC converter of claim 13, wherein said load current detector comprises a resistor inserted in a path of a load current of said rectifier circuit.

15. A switching type DC-DC converter of claim 13, wherein said load current detector comprises a current transformer connected in series of said switching means through said primary winding of said transformer, and a rectifier for detecting an amplitude of a voltage induced in a secondary winding of said current transformer.

16. A switching type DC-DC converter comprising a primary DC power supply, switching means connected in series with said power supply through a primary winding of a transformer, a rectifier circuit connected to a secondary winding of said transformer, a PWM (pulse width modulation) controller for supplying a switching signal to said switching means, said switching signal being a rectangular pulse train having a repetition frequency (f), an amplitude (VGS) and a controllable pulse width, and means for controlling said PWM controller wherein said controllable pulse width is controlled to keep an output voltage of said rectifier circuit at a constant value;

characterized in that:
said switching means comprises a first FET, and a second FET connected in parallel to said first FET or disconnected from said switching means by a first on-off switch means,
said rectifier circuit is connected to a smoothing circuit comprising a smoothing capacitor, a first smoothing choke for connecting output of said rectifier circuit to said smoothing capacitor, a second smoothing choke connected in parallel to said first smoothing choke or disconnected from said smoothing circuit by a second on-off switch means, and a dummy load connected in parallel to said smoothing capacitor, said switching type DC-DC converter further comprises:
a load current detector for generating a voltage indicating a load current of said rectifier circuit,
a comparator for comparing output voltage of said load current detector to a predetermined reference voltage, and
means for disconnecting said second FET and said second smoothing choke when output of said comparator shows that the output voltage of the load current detector is lower than said reference voltage.

17. A switching type DC-DC converter of claim 16, wherein said load current detector comprises a resistor inserted in a path of a load current of said rectifier circuit.

18. A switching type DC-DC converter of claim 16, wherein said load current detector comprises a current transformer connected in series of said switching means through said primary winding of said transformer, and a rectifier for detecting an amplitude of a voltage induced in a secondary winding of said current transformer.

* * * * *